March 22, 1955 A. R. FURNAS 2,704,498
PLANT PROTECTING ATTACHMENT FOR A TRACTOR
Filed June 26, 1950 2 Sheets-Sheet 1
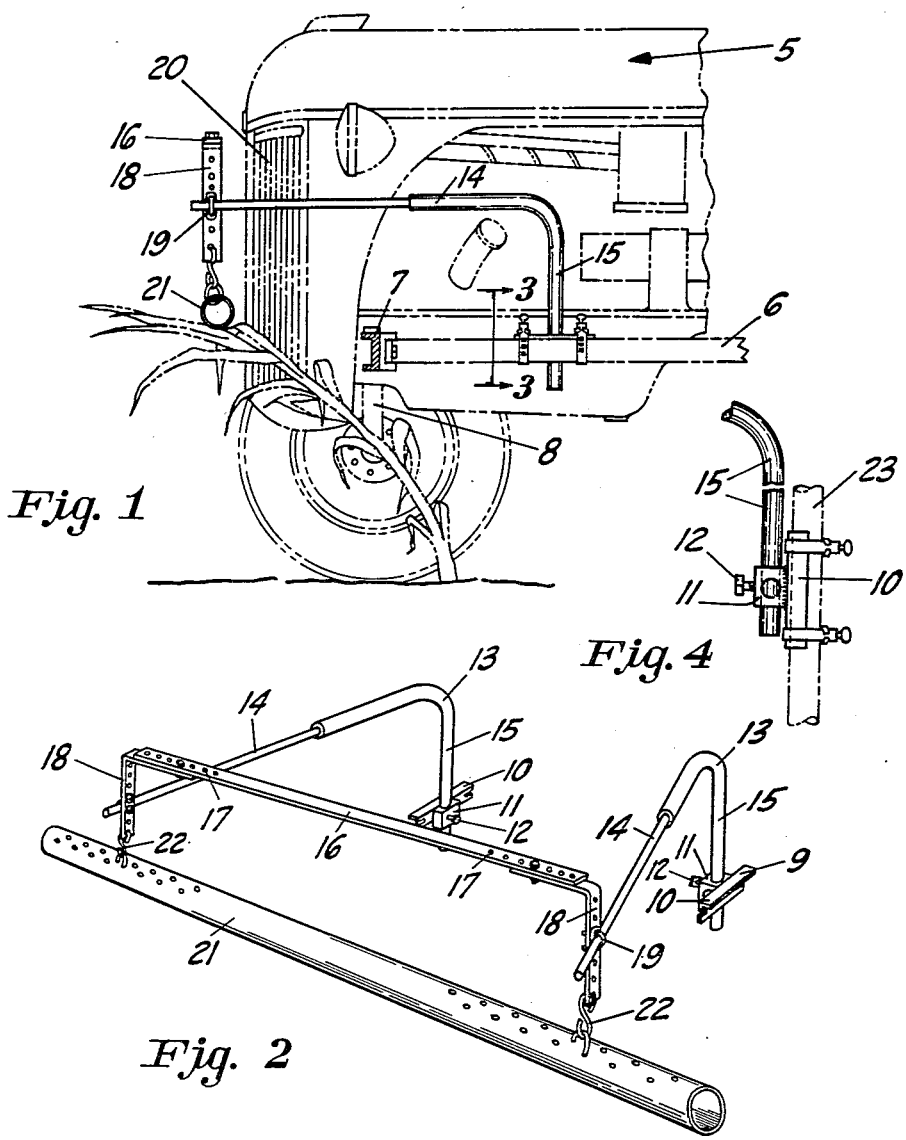
INVENTOR.
A. R. FURNAS
BY
Merrill M. Blackburn
ATTORNEY March 22, 1955  A. R. FURNAS  2,704,498
PLANT PROTECTING ATTACHMENT FOR A TRACTOR
Filed June 26, 1950  2 Sheets-Sheet 2

INVENTOR.
A. R. FURNAS
BY
Merrill M. Blackburn
ATTORNEY

United States Patent Office 2,704,498
Patented Mar. 22, 1955

2,704,498

PLANT PROTECTING ATTACHMENT FOR A TRACTOR

Aura R. Furnas, Rock Island, Ill.

Application June 26, 1950, Serial No. 170,292

4 Claims. (Cl. 97—192)

The present invention relates to an attachment for a tractor or other vehicle for use in fields of tall plants, such as corn. When a tractor is used in a corn field for hilling or cultivating, a goodly percentage of the corn stalks are broken. This breakage is normally considered inevitable loss due to mechanized farming. The fact is that the stalks are snapped due to the frame or axle being too low. However, frames and axles are now placed as high as possible, so no further improvement by raising them is possible.

Among the objects of the present invention are the provision of means to reduce breakage of the stalks of tall plants by the undercarriage of vehicles; the provision of such means which are removable and adjustable, whereby it can be employed on any of a number of variously constructed vehicles; the provision of such means as are sufficiently low in cost to warrant the use thereof; and such further objects, advantages, and capabilities as will hereafter appear and as are inherent in the structure disclosed herein. My invention further resides in the combination, construction, and arrangement of parts illustrated in the accompanying drawings and, while I have shown therein what is now regarded as the preferred embodiment of this invention, I desire the same to be understood as illustrative only and not to be interpreted in a limiting sense.

The operation of this invention is based on the fact that in waist-high corn the stalk, in the portion near the ground, has become somewhat brittle whereas the stalk farther from the ground is more flexible and of smaller diameter.

In accordance with the present invention, a bar is suspended above and forwardly of the portion of the undercarriage of a vehicle which engages plants. This bar engages the top portion of a plant and bends it over, a major portion of the bend occurring in the upper portion of the plant. The undercarriage of the vehicle will still engage the plant in going over it, but will engage it at a part of the plant farther from the ground where there is greater flexibility. It does not then have the effect of hitting the stalk where it is brittle.

A preferred form of the present invention is shown in the accompanying drawings, in which:

Fig. 1 is a fragmentary side elevation of the front portion of a tractor in which the present invention is installed;

Fig. 2 is a detail isometric view of the attachment hereof;

Fig. 3 is a section on the line 3—3 of Fig. 1, showing in detail the mount;

Fig. 4 is a detail of the mount, shown in Figs. 1 and 3, but supported by a vertical member of the vehicle.

Figure 5:
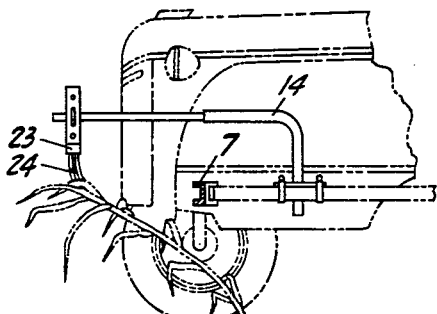
Figs. 5 to 9 illustrate various modified forms of this invention, mounted upon tractors.

Reference will now be made in greater detail to the annexed drawings for a more complete description of this invention. In the particular form of this invention shown herein, a vehicle, such as a tractor 5, is employed which has longitudinal frame members 6 at each side thereof and a cross frame member 7 at the forward end thereof. As is conventional, arms 8 depend from each end of the frame member 7 for the support of wheels at the lower ends of the arms 8. Thus the lower frame member is located at a level above the axis of the front wheels.

A pair of brackets 9 is provided for attachment to each of said frame members 6. Each of brackets 9 is formed of a length of angle iron 10 to which is secured a block 11 on the opposite side of the angle irons 10 from the frame members 6. The block 11 has two bores therethrough, the axial line of each parallel to said arm of angle iron 10, one extending transversely and the other longitudinally thereof. A set screw 12 is screw-threadedly engaged in an opening in the block 11 which extends perpendicularly to said bores. The brackets 9 are secured to the frame members 6 by clamps of any suitable type, such as the metal strap clamps with strap tighteners, as shown, and as commonly employed for radiator hose connections.

A pair of bars 13 is provided, each of which has a substantially horizontal arm 14 and a substantially vertical arm 15, with the vertical arm 15 positioned in one of the bores of the block 10.

A strap 16 has a series of openings 17 adjacent each end thereof. A pair of straps 18, each of which has a series of openings, is bolted to the strap 16 at each end thereof with one of the arms of each strap 18 depending. A U-shaped clamp 19 is provided, with its ends extending through openings in the straps 18 for clamping the bars 14 to the straps 18. In operative position, the bars 14 extend forwardly from their vertical arms 15 to a position ahead of and to the sides of the grill 20. Adjustment, relatively, of the strap 16 and the straps 18 allows for positioning of the device on widely divergent vehicles.

A drag 21 is suspended by links 22 which are connected to the drag 21 and, individually, to the lower ends of the straps 18. The drag 21 is provided at each of its ends with a series of openings to allow the attachment of the links 22 at adjusted positions.

In Figs. 1 and 3, the brackets 9 are shown connected to a horizontal frame member. As shown in Fig. 4, the same bracket may be employed for attachment to a vertical frame member 23.

In operation, the plant protector is adjusted to position the drag forwardly and above the level of the lowest frame member of the vehicle. Preferably, the angle made by a plane through the drag and the axle of the tractor is less than forty-five degrees (45°). The drag bends the corn over as the tractor moves through the field, much of the bend coming in the more flexible upper part of the plant. When the tractor moves to the point that the frame member engages the stalk, there is a much greater length of stem between the point of engagement and the ground than if the plant had not initially been bent over. Accordingly, less breakage of stalks occurs.

Figure 6:
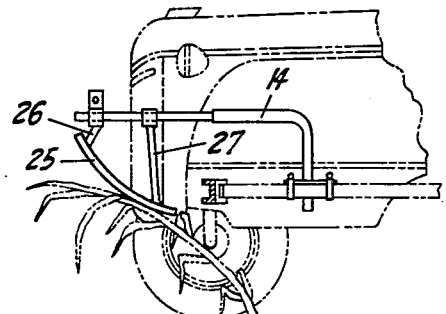
Figure 8:
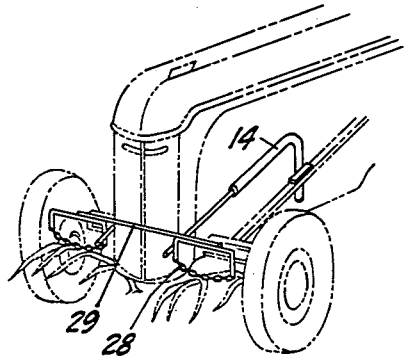

In the form hereof which is shown in Fig. 5, a brush 23 which has depending bristles 24 is secured to the forward end of arm 14. Fig. 6 shows a form hereof in which a shoe 25 is secured as by brackets 26 and 27 to arm 14. In Fig. 8 is shown a form hereof in which chains 28 are suspended transversely of the tractor from a frame 29 supported by arms 14. Each of the devices of Figs. 5, 6, and 8 function the same as that shown in Figs. 1 and 2.

Figure 7:
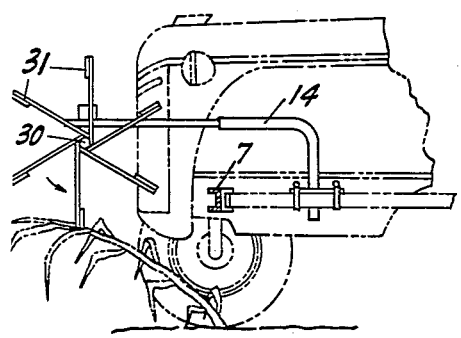

In Fig. 7 there is disclosed a form hereof in which the arms 14 support a shaft 30 upon which reels 31 are mounted for rotation, one on each side of the engine and ahead of frame member 7. In this form, as, likewise, in Fig. 6, the device first contacts the corn at a point forwardly and above the frame member 7. The reel is supported to turn freely under the action of the corn. Thus, the point of contact on the stalk will be relatively high and thereby avoid breakage by distributing the bending over a greater length of stalk, including the more flexible upper section.

Figure 9:
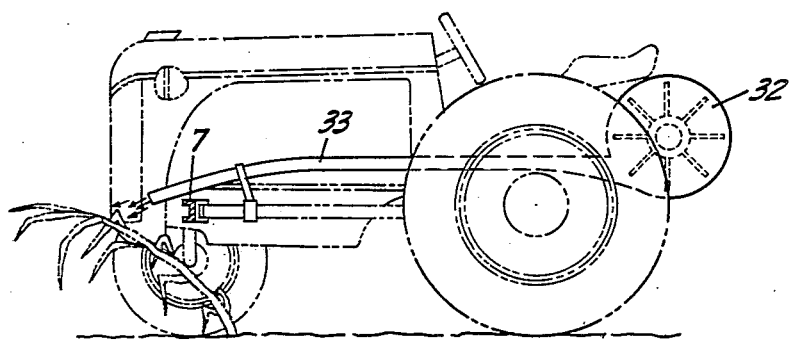

In Fig. 9 there is shown a form in which a blower 32 is connected to an exhaust pipe 33 which extends to a point slightly above and forwardly of the frame 7. This blower produces a stream of air which bends the corn over before contact at a low level is effected.

It is of course understood that the specific description of structure set forth herein may be departed from without departing from the spirit of this invention as disclosed in this specification and as defined by the appended claims.

Having now described my invention, I claim:

1. A device for reducing plant damage by the passage of a vehicle through a field of plants, including a drag for engaging and bending over the tops of said plants, means for supporting said drag from a vehicle, comprising a pair of clamps for mounting on the frame of a vehicle, a pair of bent bars having forwardly extending arms and vertical arms for slidable, adjustable engagement in said clamps, a strap support having depending ends, said ends being secured at a mid-point thereof to the forward ends of said forwardly extending arms, and link connections between said drag and the lower ends of said depending ends.

2. A device for reducing plant damage by the passage of a vehicle through a field of plants, including a drag for engaging and bending over the tops of said plants, supporting means for supporting said drag from a vehicle, comprising a pair of clamps for mounting on the frame of a vehicle, a pair of bent bars having forwardly extending arms and vertical arms for slidable, adjustable engagement in said clamps, and swingable means for swingably supporting said drag from the forward ends of said forwardly extending arms.

3. In a tractor, protective means for preventing injury to plants growing in a field, said means comprising a bar suspended from the front of the tractor, flexible means connected to the bar and suspending the bar for bending the plants over without injury, and adjustable means for adjusting the position of the protective means, said adjustable means comprising a pair of arms secured to the frame of the tractor for supporting the bar in front of the tractor and being adjustable longitudinally and vertically.

4. An attachment for a tractor having a transverse front axle structure to protect plants from damage by contact with said front axle structure, said attachment comprising a transversely positioned plant-engaging structure in front of and above said front axle structure, a pair of support-receiving brackets attachable to the sides of the tractor, in the rear of said front axle structure, a pair of supporting members, one for each side of the tractor, having rear portions affixed to said brackets, upper and forward portions connected at laterally spaced points with said transverse plant-engaging structure in which each of said supporting members comprises an L-shaped member having a rear depending portion and an upper portion extending forwardly from the upper end of said depending portion, and means for adjustably fastening the lower portion of each of said depending portions to the associated bracket in different vertical positions.

References Cited in the file of this patent

UNITED STATES PATENTS

| Number | Name | Date |
|---|---|---|
| 717,588 | Maloney et al. | Jan. 6, 1903 |
| 1,582,414 | McCready | Apr. 27, 1926 |
| 1,785,588 | McClain | Dec. 16, 1930 |
| 1,789,563 | Quinan | Jan. 20, 1931 |
| 2,000,260 | Snyder | May 7, 1935 |
| 2,216,313 | Fulton | Oct. 1, 1940 |
| 2,247,725 | Ferguson | July 1, 1941 |
| 2,333,153 | Crow | Nov. 2, 1943 |
| 2,369,154 | McLemore | Feb. 13, 1945 |